United States Patent
Liu et al.

(10) Patent No.: US 11,212,045 B2
(45) Date of Patent: Dec. 28, 2021

(54) SYNCHRONIZATION METHOD AND APPARATUS

(71) Applicant: China Academy of Telecommunications Technology, Beijing (CN)

(72) Inventors: Jiamin Liu, Beijing (CN); Haiyang Quan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/764,656

(22) PCT Filed: Oct. 24, 2018

(86) PCT No.: PCT/CN2018/111748
§ 371 (c)(1),
(2) Date: May 15, 2020

(87) PCT Pub. No.: WO2019/095952
PCT Pub. Date: May 23, 2019

(65) Prior Publication Data
US 2020/0389266 A1    Dec. 10, 2020

(30) Foreign Application Priority Data
Nov. 15, 2017   (CN) .......................... 201711132015.3

(51) Int. Cl.
*H04L 1/24* (2006.01)
*H04W 56/00* (2009.01)
*H04L 12/861* (2013.01)

(52) U.S. Cl.
CPC ................ *H04L 1/24* (2013.01); *H04L 49/90* (2013.01); *H04W 56/001* (2013.01)

(58) Field of Classification Search
CPC ......... H04L 1/004–0048; H04L 1/0061; H04L 1/0069; H04L 1/24–248;
(Continued)

(56) References Cited

U.S. PATENT DOCUMENTS 6,223,320 B1    4/2001   Dubey et al.
6,230,120 B1    5/2001   Suvanen
(Continued)

FOREIGN PATENT DOCUMENTS

CN    101193001 A    6/2008
CN    106302245 A    1/2017
(Continued)

OTHER PUBLICATIONS

QUALCOMM: "Updated details on APDC compression and decompression solution", 3GPP Draft, R2-1705613-UDC-APDC-TP-Update-V3, 3rd Generation Partnership Project (3GPP), Mobile Competence Centre, 650, Route des Lucioles, F-06921 Sophia-Antipolis Cedex, France, vol. RAN WG2, No. Hangzhou, China, May 15, 2017-May 19, 2017, May 14, 2017 (May 14, 2017), XP051275936, Retrieved from the Internet: URL: http://www.3gpp.org/ftp/Meetings -3GPP- SYNC/RAN2/Docs/ [retrieved on May 14, 2017].
(Continued)

*Primary Examiner* — Chi H Pham
*Assistant Examiner* — Vladislav Y Agureyev
(74) *Attorney, Agent, or Firm* — Foley & Lardner LLP

(57) ABSTRACT

A synchronization method and apparatus, for verifying whether data cached by a base station and data cached by a terminal are synchronized. In embodiments of the present invention, a transmitting device and a receiving device generate cache check values on the basis of a predetermined acquisition mode; the receiving device compares the cache check values, and according to the comparison result, deter-
(Continued)

mines whether a decompression cache area and a compression cache area are synchronized. According to the present invention, a transmitting device and a receiving device sample some data from a data cache area by means of the same acquisition mode to generate cache check values, and the receiving device compares the cache check values, and according to the comparison result, determines whether the decompression cache area and the compression cache area are synchronized.

12 Claims, 7 Drawing Sheets

(58) Field of Classification Search
CPC ... H04L 7/04–048; H04L 49/90; H04L 69/04; H04W 56/00; H04W 56/001; H04W 56/0015; H04W 56/002; H04W 56/0025; H04J 3/06–0697
See application file for complete search history.

(56) References Cited

U.S. PATENT DOCUMENTS

| | | | |
|---|---|---|---|
| 7,627,121 | B1 | 12/2009 | Reeds, III et al. |
| 2011/0179341 | A1* | 7/2011 | Falls ................ H03M 7/3088 714/807 |
| 2011/0251955 | A1 | 10/2011 | Lam |
| 2013/0114645 | A1* | 5/2013 | Huang ................ H04B 1/7083 375/147 |
| 2014/0016653 | A1* | 1/2014 | Oh ................ H04W 56/001 370/474 |
| 2014/0348270 | A1* | 11/2014 | Babu ................ H04B 13/00 375/317 |
| 2015/0156284 | A1* | 6/2015 | Akhter ................ H04L 69/04 370/477 |
| 2016/0309364 | A1 | 10/2016 | Maheshwari et al. |
| 2016/0337255 | A1* | 11/2016 | Balasubramanian ... H04L 69/22 |
| 2017/0279934 | A1* | 9/2017 | Zacharias ............ H04W 4/70 |
| 2019/0141567 | A1* | 5/2019 | Liu ................ H04L 69/04 |
| 2020/0296623 | A1* | 9/2020 | Shreevastav ............ H03M 7/30 |

FOREIGN PATENT DOCUMENTS

| | | |
|---|---|---|
| CN | 107086976 A | 8/2017 |
| CN | 107094142 A | 8/2017 |
| CN | 107113291 A | 8/2017 |
| CN | 107113649 A | 8/2017 |
| CN | 107302585 A | 10/2017 |
| JP | 02026152 A | 1/1990 |
| JP | 2016-536935 A | 11/2016 |
| WO | WO 2017/172543 A1 | 10/2017 |

OTHER PUBLICATIONS

Catt, "Introduction of DEFLATE based UDC Solution" 3GPP TSG-RAN2 Meeting #99bis, R2-1712070, Oct. 9-13, 2017, Prague, Czech Republic.

CATT. "Details of UDC solution 3" 3GPP TSG RAN WG2 Meeting #98, R2-1704688, Hangzhou, China, May 15-19, 2017, pp. 1-4.

* cited by examiner

SYNCHRONIZATION METHOD AND APPARATUS

This application is a US National Stage of International Application No. PCT/CN2018/111748, filed on Oct. 24, 2018, which claims the benefit and priority of Chinese Patent Application No. 201711132015.3, filed with the Chinese Patent Office on Nov. 15, 2017, and entitled "SYNCHRONIZATION METHOD AND APPARATUS". The entire content of each of the applications is incorporated herein by reference.

FIELD

The present invention relates to the field of wireless communications, and particularly to a synchronization method and apparatus.

BACKGROUND

In long term evolution (hereinafter "LTE") or LTE-Advanced (hereinafter "LTE-A") system, after a user equipment (hereinafter "UE") accesses a cell, an eNodeB (hereinafter "eNB") configures the UE with uplink data compression (hereinafter "UDC") function via a radio resource control (hereinafter "RRC") connection reconfiguration message. The UE compresses uplink data or signaling at layer 2 and transmits the compressed uplink data or signaling to the eNB when needed. The eNB de-compresses and cache the compressed uplink data or signaling in a corresponding protocol layer, to reduce the amount of data sent via air interface, save uplink resources and improve transmission efficiency.

To improve compression performance, cross packet compression is adopted for the UDC function. That is, when the UE compresses data, content of a preceding packet is matched to perform the compression. In this manner, the compression buffer of the UE and a decompression buffer of the eNB must be in sync. If a data packet is lost in the bottom layer, the compression and decompression buffers would be out of sync and the eNB would not be able to decompress data successfully, thus affecting uplink transmission. However, there's no existing technical solution for checking if the compression and decompression buffers of the UE and the eNB are in sync.

SUMMARY

Embodiments of the invention provide a synchronization method and apparatus, to check whether the data in buffers of the terminal and the base station are in sync in the prior art.

An embodiment of the invention provides a synchronization method. The method includes: determining, by a transmitting device, sampling positions according to a preset sampling method; sampling, by the transmitting device, partial data from a compression buffer according to the determined sampling positions; generating, by the transmitting device, a checksum according to the sampled data; and putting, by the transmitting device, the checksum into a UDC compressed data packet and transmitting the UDC compressed data packet so that a receiving device determines if the compression buffer and a decompression buffer are in sync according to the checksum.

The embodiment of the invention also provides another synchronization method. The method includes: determining, by a receiving device, sampling positions according to a preset sampling method; sampling, by the receiving device according to the determined sampling positions, partial data from a decompression buffer to generate a checksum after receiving a UDC compressed data packet; comparing, by the receiving device, a checksum in the UDC compressed data packet and the generated checksum; and determining, by the receiving device, if the compression and decompression buffers are in sync according to a result of the comparison.

The embodiment of the invention also provides a transmitting device for synchronization. The transmitting device includes a processor, a memory and a transceiver. The processor is responsible for managing bus architecture and general processing. The memory stores data used by the processor when performing operations. The transceiver is configured to receive and transmit data under the control of the processor. The processor is configured to read a program in the memory to: determine sampling positions according to a preset sampling method; sample partial data from a compression buffer according to the determined sampling positions; generate a checksum according to the sampled data; and put the checksum into a UDC compressed data packet and transmit the UDC compressed data packet via the transceiver so that a receiving device determines if the compression buffer and a decompression buffer are in sync according to the checksum.

The embodiment of the invention further provides a receiving device for synchronization. The receiving device includes a processor, a memory and a transceiver. The processor is responsible for managing bus architecture and general processing. The memory stores data used by the processor when performing operations. The transceiver is configured to receive and transmit data under the control of the processor. The processor is configured to read a program in the memory to: determine sampling positions according to a preset sampling method; sample partial data from a decompression buffer according to the determined sampling positions to generate a checksum after receiving a UDC compressed data packet via the transceiver; compare a checksum in the UDC compressed data packet and the generated checksum; and determine if the compression and decompression buffers are in sync according to a result of the comparison.

The embodiment of the invention further provides another transmitting device for synchronization. The transmitting device includes a first determine module, a first execute module and a transmit module. The first determine module is configured to determine sampling positions according to a preset sampling method. The first execute module is configured to sample partial data from a compression buffer according to the determined sampling positions and generate a checksum according to the sampled data. The transmit module is configured to put the checksum into a UDC compressed data packet and transmit the UDC compressed data packet so that a receiving device determines if the compression buffer and a decompression buffer are in sync according to the checksum.

The embodiment of the invention also provides another receiving device for synchronization. The receiving device includes a second determine module, a receive module and a second execute module. The second determine module is configured to determine sampling positions according to a preset sampling method. The receive module is configured to receive a UDC compressed data packet. The second execute module is configured to sample partial data from a decompression buffer according to the determined sampling positions to generate a checksum, compare a checksum in the UDC compressed data packet and the generated checksum, and determine if the compression and decompression buffers are in sync according to a result of the comparison.

The embodiment of the invention also provides a readable storage medium for synchronization. The storage medium includes program codes. When the program codes are run by a computing device, the computing device performs the method performed by the receiving device or performed by the transmitting device.

According to the embodiment of the invention, the transmitting device samples partial data from the compression buffer according to the preset sampling method to generate a checksum, and puts the checksum into the UDC compressed data packet to be transmitted to the receiving device. The receiving device samples partial data from the decompression buffer according to the same sampling method to generate a checksum, compares the checksum in the UDC compressed data packet and the generated checksum, and determines if the compression and decompression buffers are in sync according to the result of the comparison. Since the transmitting and receiving devices sample data from the buffers using a same sampling method to generate checksums, the receiving device compares the checksums and determines if the compression and decompression buffers are in sync according to the comparison result, and it determines that the buffers are in sync if the checksums are the same, or it determines that the buffers are out of sync when the checksums are different, so that whether the compression and decompression buffers of the terminal and the base station are in sync can be checked and transmission efficiency is improved.

BRIEF DESCRIPTION OF THE DRAWINGS

To describe the technical solutions according to the embodiment of the invention more clearly, drawings illustrating the embodiment of the invention are briefly introduced below. Apparently, the drawings introduced below illustrate only a part of implementations of the embodiment of the invention and those skilled in the art can obtain other drawings according to the drawings introduced below without making any inventive effort.

DETAILED DESCRIPTION OF THE EMBODIMENTS

Some terms herein are explained below to facilitate understanding.

1. The words "network" and "system" are interchangeable herein, the meaning of which a person skilled in the art should be able to understand.

2. The expression "a plurality of" herein refers to two or more than two. Other quantifiers are similarly interpreted.

3. The expression "and/or" describes the relationships between related objects, and refers to three kinds of relationships. For example, A and/or B represents the three situations that only A exists, both A and B exist, and only B exists. The symbol "/" represents a "or" relationship.

In order to make the objects, technical solutions, and advantages of the embodiment of the invention more apparent, the technical solutions according to the embodiment of the invention will be described below clearly and fully with reference to the accompanying drawings. Apparently the implementations to be described below are only a part but not all of the implementations of the embodiment of the invention. Based upon the implementations of the embodiment of the invention described herein, all other implementation which can occur to those ordinarily skilled in the art without making any inventive effort shall fall into the scope of the invention.

Figure 1:
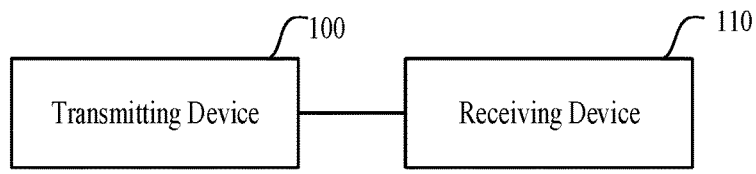
FIG. 1 is a schematic diagram of a structure of a system according to an embodiment of the invention.

As illustrated by FIG. 1, a system for synchronization according to the embodiment of the invention includes a transmitting device 100 and a receiving device 110.

The transmitting device 100 is configured to: determine sampling positions according to a preset sampling method; sample partial data from a compression buffer according to the determined sampling positions; generate a checksum according to the sampled data; and put the checksum into a UDC compressed data packet and transmit the UDC compressed data packet so that the receiving device determines if the compression buffer and a decompression buffer are in sync according to the checksum.

The receiving device 110 is configured to: determine sampling positions according to the preset sampling method; sample partial data from the decompression buffer according to the determined sampling positions to generate a checksum after receiving the UDC compressed data packet; compare the checksum in the UDC compressed data packet and the generated checksum; and determine if the compression and decompression buffers are in sync according to a result of the comparison.

The transmitting device may be a terminal, and the receiving device may be a network side device.

According to the embodiment of the invention, the transmitting device samples partial data from the compression buffer according to the preset sampling method to generate a checksum, and puts the checksum into the UDC compressed data packet to be transmitted to the receiving device. The receiving device samples partial data from the decompression buffer according to the same sampling method to generate a checksum, compares the checksum in the UDC compressed data packet and the generated checksum, and determines if the compression and decompression buffers are in sync according to the result of the comparison. Since the transmitting and receiving devices sample data from the buffers using a same sampling method to generate checksums, the receiving device compares the checksums and determines if the compression and decompression buffers are in sync according to the comparison result, and it determines that the buffers are in sync if the checksums are the same, or it determines that the buffers are out of sync when the checksums are different, whether the compression and decompression buffers of the terminal and the base station are in sync can be checked and transmission efficiency is improved.

According to the embodiment of the invention, sampling positions of UDC may be determined according to a preset sampling method to sample data from a buffer to generate a checksum.

The embodiment of the invention provides two sampling methods for sampling partial data from the buffer. One method is to sample data from the buffer according to preset fixed position information and the other method is to sample data from the buffer according to preset pattern position information. The two different methods are described below in detail.

1. Sampling Partial Data from the Buffer According to Preset Fixed Position Information During implementation, the fixed position information may be determined according to a standard or may be configured by the network side device.

The fixed position information may indicate one of the three kinds of information below.

(1) The first M bytes in the buffer are taken as sampling positions.

Figure 2:
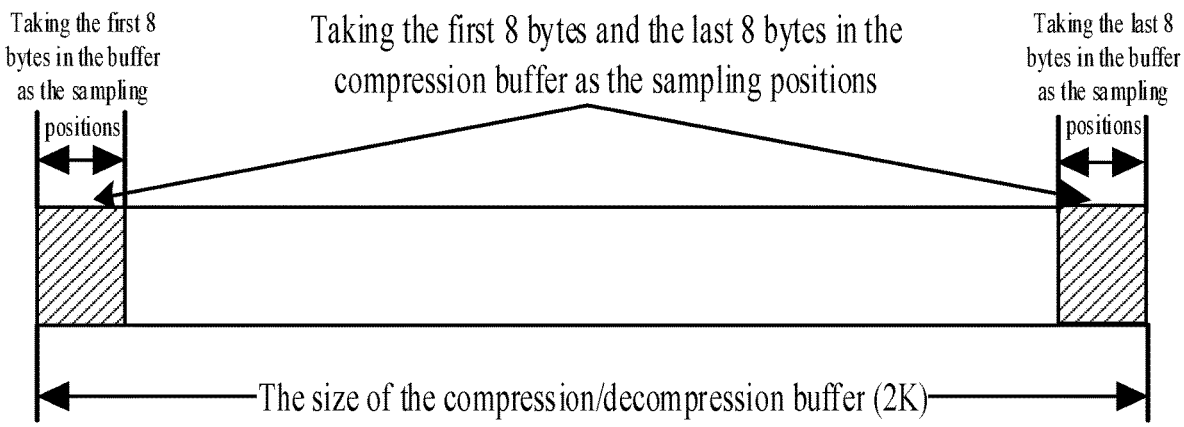
FIG. 2 is a schematic diagram of determining sampling positions according to preset fixed position information according to the embodiment of the invention.

For example, as illustrated by FIG. 2, when the size of the buffer is set to be 2 kilobytes, the first 8 bytes of the buffer are taken as sampling positions and data extracted from the 8 bytes are taken as the sampling data.

(2) The last N bytes in the buffer are taken as the sampling positions.

For example, as illustrated by FIG. 2, when the size of the buffer is set to be 2 kilobytes, the last 8 bytes of the buffer as taken as the sampling positions and data extracted from the 8 bytes are taken as the sampling data.

(3) The first M bytes and the last M bytes in the buffer are taken as the sampling positions.

For example, as illustrated by FIG. 2, when the size of the buffer is set to be 2 kilobytes, the first 8 bytes in the head of the buffer and the 16 bytes in the tail of the buffer are taken as the sampling positions and data extracted from the 24 bytes are taken as the sampling data.

2. Determining the Sampling Positions According to Preset Pattern Position Information to Generate a Checksum During implementation, the preset pattern position information may be determined by a standard, or may be configured by the network side.

Optionally, the pattern position information includes but is not limited to a part or all of:

the number of bytes in a sampling period, i.e., how many bytes are included in each sampling period;

the number of sampled bytes in a sampling period, i.e., how many bytes are sampled in each sampling period;

the sampling positions in a sampling period, i.e., the positions where sampling is performed in each sampling period;

the number of bytes of a sampling interval, i.e., the number of bytes in interval between two sampling start positions;

the number of sampling intervals, i.e., how many sampling intervals there are;

the number of bytes sampled between two adjacent sampling intervals, i.e., the number of bytes per sampling; and a sampling direction, i.e., from the head to the tail or from the tail to the head.

It is to be noted that the pattern position information above is just an example and any information that can be used to determine the position for sampling data may be used as the pattern position information according to the embodiment of the invention.

Examples of determining the sampling positions according to the pattern position information including the above information are described below.

1. When the pattern position information includes the number of sampling intervals, the number of bytes sampled between two adjacent sampling intervals and the sampling direction, the two methods below may be used for determining the sampling positions according to the embodiment of the invention.

(1) The sampling direction is from a head to a tail of the buffer.

Figure 3:
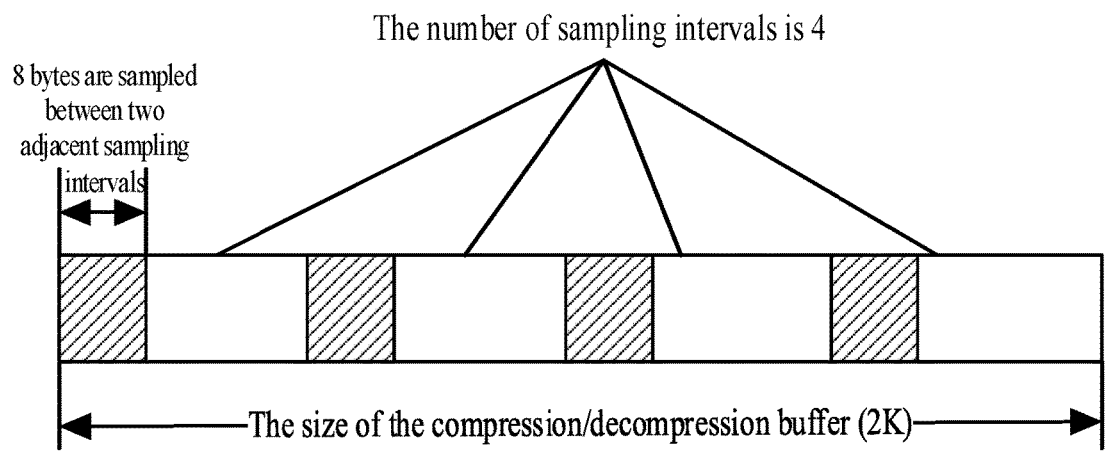
FIG. 3 is a schematic diagram of determining sampling positions according to the number of sampling intervals and the number of bytes sampled between two adjacent sampling intervals when the sampling direction is from a head of a buffer to a tail of the buffer according to the embodiment of the invention.

As illustrated by FIG. 3, suppose that the size of the buffer is set to be 2 kilobytes (2048 bytes), the number of sampling intervals is 4, and 8 bytes are sampled between two adjacent sampling intervals, then the 2048 bytes may be divided into 4 parts having equivalent lengths, and the first 8 bytes of each of the 4 parts may be used as the sampling positions.

(2) The sampling direction is from the tail to the head of the buffer.

Figure 4:
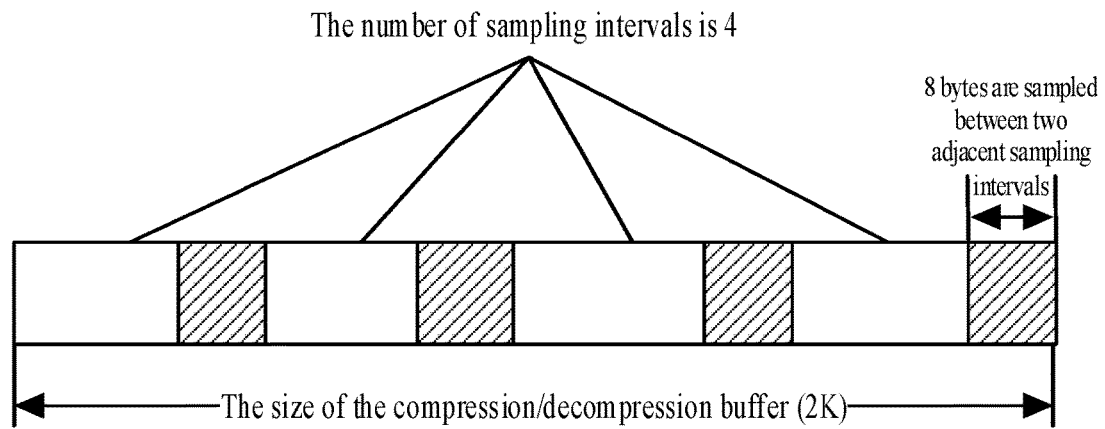
FIG. 4 is a schematic diagram of determining the sampling positions according to the number of sampling intervals and the number of bytes sampled between two adjacent sampling intervals when the sampling direction is from the tail of the buffer to the head of the buffer according to the embodiment of the invention.

As illustrated by FIG. 4, suppose that the size of the buffer is set to be 2 kilobytes (2048 bytes), the number of sampling intervals is 4, and 8 bytes are sampled between two adjacent sampling intervals, then the 2048 bytes may be divided into 4 parts having equivalent lengths, and the last 8 bytes of each of 4 parts may be used as the sampling positions.

2. When the pattern position information includes the number of sampling intervals and the number of bytes sampled between two adjacent sampling intervals, the sampling positions may be determined by taking the first X bytes and the last X bytes in the buffer as the sampling positions, and then determining the sampling positions in the buffer except the first X bytes and the last X bytes according to the number of sampling intervals and the number of bytes sampled between two adjacent intervals. Here X represents the number of bytes sampled between two adjacent intervals.

Figure 5:
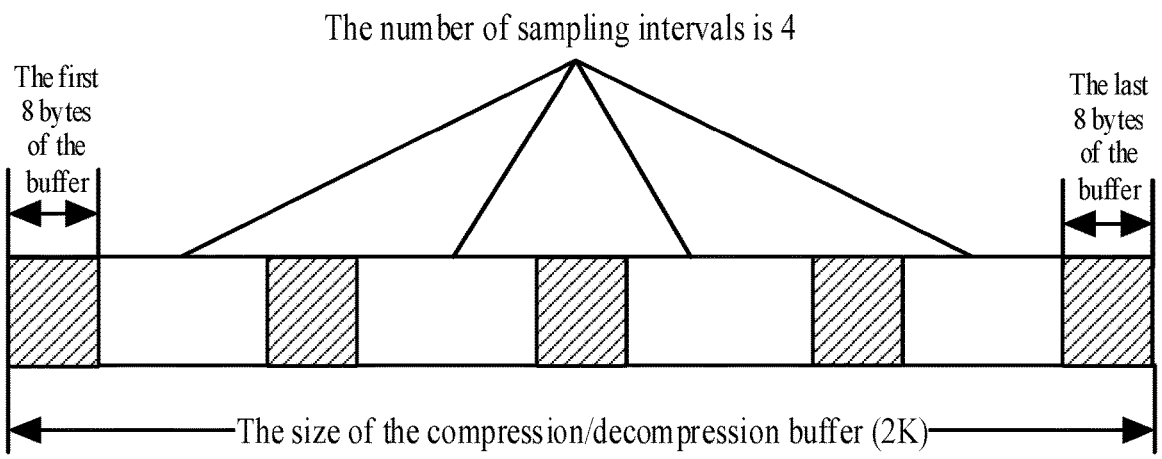
FIG. 5 is a schematic diagram of determining the sampling positions as first X bytes and last X bytes in the buffer according to the number of sampling intervals and the number of bytes sampled between two adjacent sampling intervals according to the embodiment of the invention.

As illustrated by FIG. 5, suppose that the size of the buffer is set to be 2 kilobytes (2048 bytes), the number of sampling intervals is 4, and the first 8 bytes and the last 8 bytes in the buffer are taken as the sampling positions. In this case, the first 8 bytes, [1, 8], and the last 8 bytes, [2041, 2048], of the buffer are determined as the sampling positions; then among the rest 2032 bytes, [9, 2040], the sampling positions are determined according to the number of sampling intervals.

3. When the pattern position information includes the number of bytes in the sampling period, the number of sampled bytes in the sampling period and the sampling positions in the sampling period, the sampling positions are determined as follows.

Figure 6:
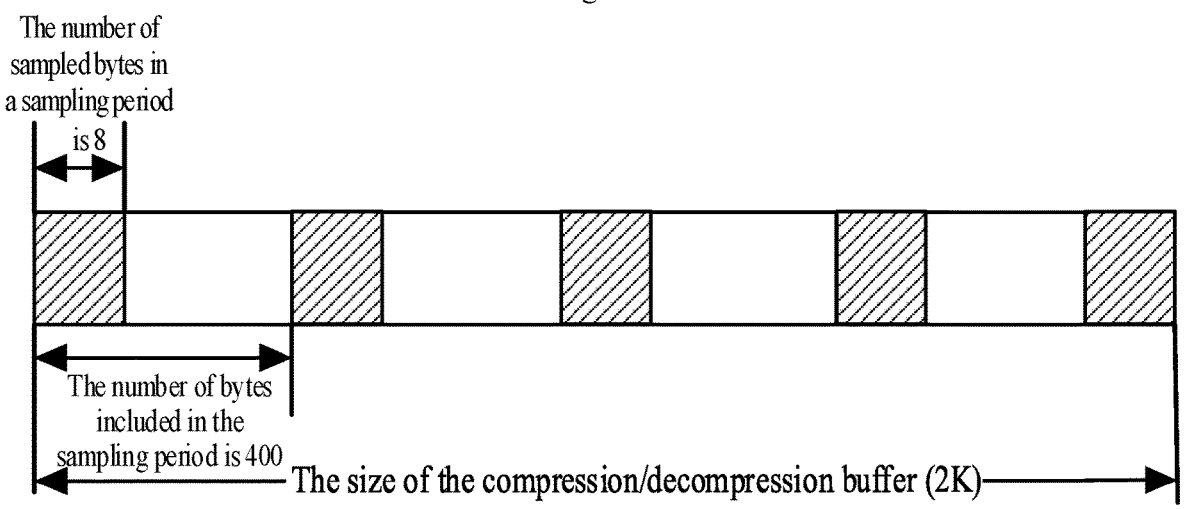
FIG. 6 is a schematic diagram of determining the sampling positions according to the number of bytes in a sampling period, the number of sampled bytes in the sampling period and sampling positions in the sampling period according to the embodiment of the invention.

As illustrated by FIG. 6, suppose that the size of the buffer is set to be 2 kilobytes (2048 bytes), and the number of bytes included in the sampling period is 400, the number of sampled bytes in the sampling period is 8, and the sampling positions of the sampling period starts from the head of the sampling period. First of all, the bytes [1, 400] in the buffer are determined as an interval of data pattern, where the bytes [1, 8] of the first 400 bytes are determined as the sampling positions, and data of the bytes [9, 400] are determined as other data. Then the bytes [401, 800] in the buffer are determined as another sampling interval, where the bytes [401, 408] are determined as sampling positions and data of the bytes [409, 800] are determined as other data. The process is repeated till the end of the buffer.

Accordingly, the positions where sampling is performed in a sampling period may be the tail of the sampling period alternatively, or any other position in the sampling period, in which case the sampling positions may be determined in a similar way as what is illustrated by FIG. 6.

4. When the pattern position information includes the number of bytes in a sampling interval, the number of bytes sampled between two adjacent sampling intervals and the sampling direction, the sampling positions may be determined as follows.

Figure 7:
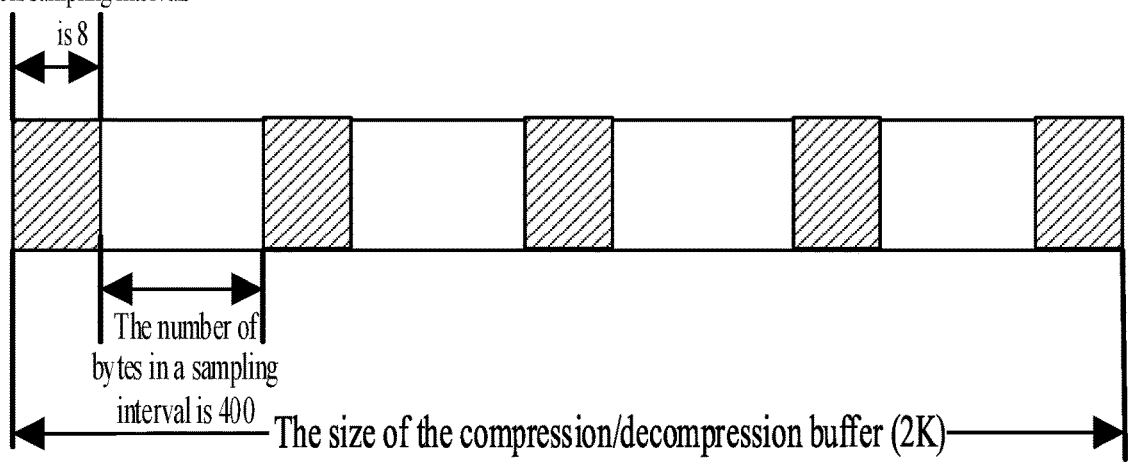
FIG. 7 is a schematic diagram of determining the sampling positions according to the number of bytes in a sampling interval, the number of bytes sampled between two adjacent sampling intervals and the sampling direction according to the embodiment of the invention.

As illustrated by FIG. 7, suppose that the size of the buffer is set to be 2 kilobytes (2048 bytes), the number of bytes in a sampling interval is 400, the number of bytes sampled between two adjacent sampling intervals is 8 and the sampling direction is from the head to the tail of the buffer. Then sampling starts from the first byte of the buffer, the bytes [1, 8] in the buffer are determined as sampling positions, data of the bytes [9, 408] is determined as other data, the bytes [409, 416] are determined as sampling positions, and the data of the bytes [417, 816] is determined as other data. The process is repeated till the end of the buffer.

Accordingly, the sampling direction may be from the tail to the head of the buffer alternatively, in which case the sampling positions may be determined in a way similar to what is illustrated by FIG. 7.

When the pattern position information is the same as in the example 3 or 4 above, it would be easy to determine the sampling positions, the sampling positions and the number of sampled bytes would change as the size of the buffer changes.

In implementation, the transmitting device configured with UDC samples data from the compression buffer according to determined sampling positions to generate a checksum and puts the checksum into a UDC compressed data packet to be transmitted to the receiving device, so that the receiving device determines whether the compression and decompression buffers are in sync according to the checksum in the UDC compressed data packet.

The transmitting device may determine the sampling positions in the compression buffer using any of the sampling methods above and extract data from the one or more determined sampling positions to generate the checksum.

Accordingly, the receiving device may also determine the sampling positions according to a preset sampling method and sample data from the decompression buffer according to the one or more determined sampling positions to generate a checksum.

The receiving device may determine the sampling positions in the decompression buffer by using any of the sampling methods above and extract data from the determined sampling positions to generate the checksum.

In implementation, the way that the receiving device determines the sampling positions is the same as the way that the transmitting device determines its sampling positions. For example, when the transmitting device determines sampling positions by sampling data from the compression buffer according to preset fixed position information, the receiving device also determines sampling positions by sampling data from the decompression buffer according to the preset fixed position information.

Accordingly, the receiving device compares the checksum generated by itself and the checksum in the received UDC compressed data packet, and determines if the compression and decompression buffers are in sync.

If the two checksums are equal, it means that the compression buffer of the transmitting device and the decompression buffer of the receiving device are in sync. If the two checksums are different, it means that the compression buffer of the transmitting device and the decompression buffer of the receiving device are out of sync, and then the receiving device performs a recovery process to avoid failure of decompression.

Since the buffers of the transmitting device and the receiving device are continuously updated, once new data is correctly received or transmitted, the new data is put into the tail of one of the buffers and old data in the head would be pushed out of the buffer to bring about the update of the buffer. If the transmitting device and the receiving device update the buffers in sync, then the checksums calculated by the transmitting and receiving devices according to data sampled from the heads and/or tails of the respective buffers would be the same. If some data is not put into the respective buffers by the transmitting and receiving devices in sync, then data in the tail and head of the two buffers are different, leading to different checksums calculated according to data sampled from the head and/or tail of the two buffers, respectively, which means that the buffers of the transmitting device and the receiving device are out of sync.

The way in which the checksum is generated by the transmitting device and the receiving device are required to be the same, which is not limited. For example, the checksum may be generated by using at least one of the following exemplary methods.

1. Adding every 4 bits of the sampled data to generate the checksum

For example, the data extracted from the sampling positions in the buffer by the transmitting device or by the receiving device is 0100 1101, where the content of the buffer before the extraction is 0011 0101 0100 0011 1101 . . . , then every 4 bits of the extracted data are added together without the carry of the highest bits to obtain the checksum (i.e. 0100+1101=0001), or every 4 bits of the extracted data are added together and then the carry of the highest bits is transferred and added to the lowest bit of the sum to obtain the checksum (i.e., 0100+1101=0010).

In contrast, if the transmitting or receiving device does not extract data according to the sampling positions, then every 4 bits of the content of the corresponding buffer, which is 0011 0101 0100 0011 1101 . . . , need to be added together to obtain the checksum, making the computation much more complex.

2. Adding every bit of the sampled data, and taking the highest 4 bits or the lowest 4 bits of the sum as the checksum For example, the data extracted from the sampling positions in the buffer by the transmitting device or by the receiving device is 0100 1101, where the content of the buffer before the extraction is 0011 0101 0100 0011 1101 . . . , then every bit of the sampled data (0100 1101) are added together to obtain the checksum (i.e. 0+1+0+0+1+1+0+1=0100).

When the sum is a big number, e.g., greater than the largest 4-bit binary number, then the highest or lowest 4 bits of the sum may be used to as the checksum.

It is to be noted that, some examples herein according to the embodiment of the invention are described in the form of decimal addition, but during implementation, binary addition may be directly used in the program.

3. Adding every bit of the sampled data, and then adding every 4 bits of the sum, where if there is a carry of the highest bits, the carry is shifted and added to the lowest bit of the sum, to obtain a 4-bit checksum.

For example, the sum of every bit of the data sampled from the sampling positions in the buffer by the transmitting or receiving device is 200 (decimal), which equals to 11001000 in the binary system. Then every 4 bits of the sum are added without the carry of the highest bits to obtain the checksum (i.e., 1100+1000=0100). Or, the carry of the highest bits is transferred and added to the lowest bit of the sum to obtain the checksum (i.e., 1100+1000=0101).

Figure 8:
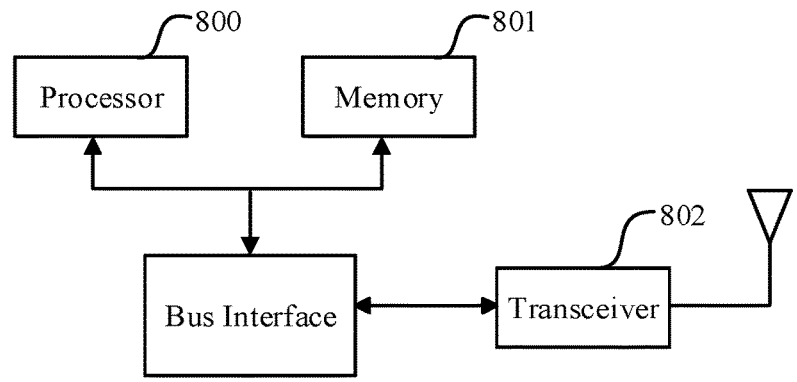
FIG. 8 is a schematic diagram of a structure of a transmitting device according to the embodiment of the invention.

As illustrated by FIG. 8, the embodiment of the invention provides a transmitting device for synchronization. The transmitting device includes a processor 800, a memory 801 and a transceiver 802.

The processor 800 is responsible for managing the bus architecture and general processing. The memory 801 may store data used by the processor 800 when performing operations. The transceiver 802 is configured to receive and transmit data under the control of the processor 800.

The bus architecture may include any number of interconnected buses and bridges, linking together various circuits of one or more processors represented by the processor 800 and one or more memories represented by the memory 801. The bus architecture may also link various other circuits such as peripherals, voltage regulators, and power management circuits, which are well known in the art, so they are not described further herein. The bus interfaces provide interfaces. The processor 800 is responsible for managing the bus architecture and general processing, and the memory 801 may store data used by the processor 800 when performing operations.

The flows according to the embodiment of the invention may be applied to the processor 800 or implemented by the processor 800. In the implementation, each operation of the signal processing flow may be implemented by a hardware integrated logic circuit or a software instruction in the processor 800. The processor 800 may be a general-purpose processor, a digital signal processor, an application-specific integrated circuit, a field programmable gate array or other programmable logic device, a discrete gate or transistor logic device, or a discrete hardware component, which may implement or execute the methods, operations and logical block diagrams according to the embodiment of the invention. A general-purpose processor may be a microprocessor or any conventional processor. The operations of the method disclosed in combination with the embodiment of the invention may be directly implemented by a hardware processor, or may be performed by a combination of hardware and software modules in the processor. The software modules may be located in a storage medium such as a random access memory, a flash memory, a read-only memory, a programmable read-only memory, an electrically erasable programmable memory, or a register. The storage medium is located in the memory 801, and the processor 800 reads the information in the memory 801 and implements the operations of the signal processing flow in combination with its hardware.

The processor 800 is configured to read a program in the memory 801 to: determine sampling positions according to a preset sampling method; sample data from a compression buffer according to the determined sampling positions; generate a checksum according to the sampled data; and put the checksum into a UDC compressed data packet and transmit the UDC compressed data packet via the transceiver 802 so that a receiving device determines if the compression buffer and a decompression buffer are in sync according to the checksum.

Optionally, the processor 800 is further configured to read the program to: determine the sampling positions according to preset fixed position information or preset pattern position information.

Optionally, the fixed position information includes that first M bytes in the compression buffer and/or last N bytes in the compression buffer are taken as the sampling positions.

Optionally, the pattern position information includes part or all of: the number of bytes included in a sampling period, the number of sampled bytes in the sampling period, sampling positions in the sampling period, the number of bytes in a sampling interval, the number of sampling intervals, the number of bytes sampled between two adjacent sampling intervals, and a sampling direction.

Optionally, the pattern position information includes the number of sampling intervals and the number of bytes sampled between two adjacent sampling intervals. The processor 800 is further configured to read the program to: determine first X bytes and last X bytes in the compression buffer as the sampling positions, where X is the number of bytes sampled between two adjacent sampling intervals; and determine, among the data of the compression buffer except the first X bytes and the last X bytes, the sampling positions according to the number of sampling intervals and the number of bytes sampled between two adjacent intervals.

Figure 9:
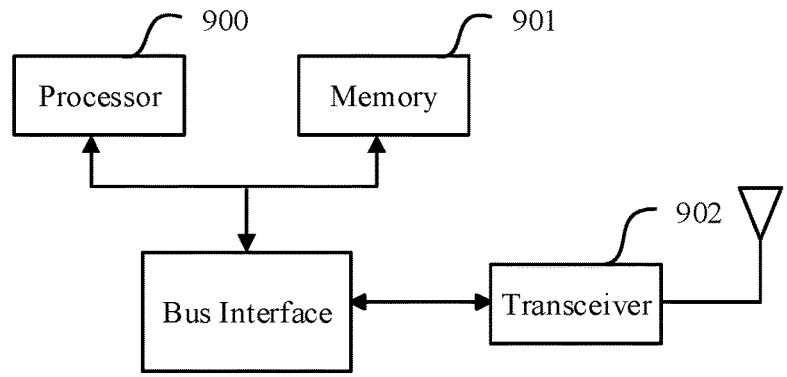
FIG. 9 is a schematic diagram of a structure of a receiving device according to the embodiment of the invention.

As illustrated by FIG. 9, the embodiment of the invention further provides a receiving device for synchronization. The receiving device includes a processor 900, a memory 901 and a transceiver 902.

The processor 900 is responsible for managing the bus architecture and general processing. The memory 901 may store data used by the processor 900 when performing operations. The transceiver 902 is configured to receive and transmit data under the control of the processor 900.

The bus architecture may include any number of interconnected buses and bridges, linking together various circuits of one or more processors represented by the processor 900 and one or more memories represented by the memory 901. The bus architecture may also link various other circuits such as peripherals, voltage regulators, and power management circuits, which are well known in the art, so they are not described further herein. The bus interfaces provide interfaces. The processor 900 is responsible for managing the bus architecture and general processing, and the memory 901 may store data used by the processor 900 when performing operations.

The flows according to the embodiment of the invention may be applied to the processor 900 or implemented by the processor 900. In the implementation, each operation of the signal processing flow may be implemented by a hardware integrated logic circuit or a software instruction in the processor 900. The processor 900 may be a general-purpose processor, a digital signal processor, an application-specific integrated circuit, a field programmable gate array or other programmable logic device, a discrete gate or transistor logic device, or a discrete hardware component, which may implement or execute the methods, operations and logical block diagrams according to the embodiment of the invention. A general-purpose processor may be a microprocessor or any conventional processor. The operations of the method disclosed in combination with the embodiment of the invention may be directly implemented by a hardware processor, or may be performed by a combination of hardware and software modules in the processor. The software modules may be located in a storage medium such as a random access memory, a flash memory, a read-only memory, a programmable read-only memory, an electrically erasable programmable memory, or a register. The storage medium is located in the memory 901, and the processor 900 reads the information in the memory 901 and implements the operations of the signal processing flow in combination with its hardware.

The processor 900 is configured to read a program in the memory 901 to: determine sampling positions according to a preset sampling method; sample partial data from a decompression buffer according to the determined sampling positions to generate a checksum after receiving a UDC compressed data packet via the transceiver 902; compare a checksum in the UDC compressed data packet and the generated checksum; and determine if the compression and decompression buffers are in sync according to a result of the comparison.

Optionally, the processor 900 is further configured to read the program to: determine the sampling positions according to preset fixed position information or preset pattern position information.

Optionally, the fixed position information includes that first M bytes in the decompression buffer and/or last N bytes in the decompression buffer are taken as the sampling positions.

Optionally, the pattern position information includes part or all of: the number of bytes in a sampling period, the number of sampled bytes in a sampling period, sampling positions of in a sampling period, the number of bytes in a sampling interval, the number of sampling intervals, the number of bytes sampled between two adjacent sampling intervals, and a sampling direction.

Optionally, the processor 900 is further configured to read the program to: determine first X bytes and last X bytes in the compression buffer as the sampling positions, where X is the number of bytes sampled between two adjacent sampling intervals; and determine, among the data of the compression buffer except the first X bytes and the last X bytes, the sampling positions, according to the number of sampling intervals and the number of bytes sampled between two adjacent intervals.

Figure 10:
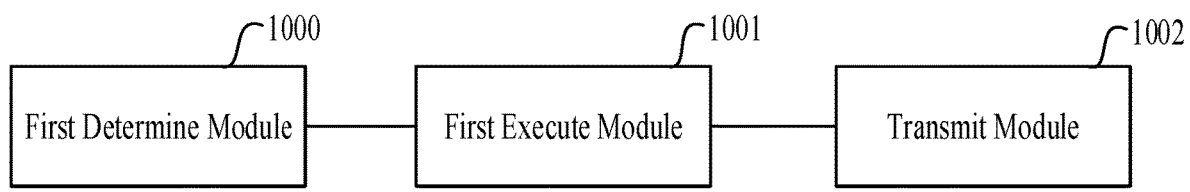
FIG. 10 is a schematic diagram of a structure of another transmitting device according to the embodiment of the invention.

As illustrated by FIG. 10, the embodiment of the invention further provides a transmitting device for synchronization. The transmitting device includes a first determine module 1000, a first execute module 1001 and a transmit module 1002. The first determine module 1000 is configured to determine sampling positions according to a preset sampling method. The first execute module 1001 is configured to sample data from a compression buffer according to the determined sampling positions and generate a checksum according to the sampled data. The transmit module 1002 is configured to put the checksum into a UDC compressed data packet and transmit the UDC compressed data packet so that a receiving device determines if the compression buffer and a decompression buffer are in sync according to the checksum.

Optionally, the first determine module 1000 is further configured to: determine the sampling positions according to preset fixed position information or preset pattern position information.

Optionally, the fixed position information includes that first M bytes in the compression buffer and/or last N bytes in the compression buffer are taken as the sampling positions.

Optionally, the pattern position information includes part or all of: the number of bytes in a sampling period, the number of sampled bytes in a sampling period, sampling positions of a sampling period, the number of bytes in a sampling interval, the number of sampling intervals, the number of bytes sampled between two adjacent sampling intervals, and a sampling direction.

Optionally, the first determine module 1000 is further configured to: determine first X bytes and last X bytes in the compression buffer as the sampling positions, where X is the number of bytes sampled between two adjacent sampling intervals; and determine, among data in the compression buffer except the first X bytes and the last X bytes, the sampling positions according to the number of sampling intervals and the number of bytes sampled between two adjacent intervals.

Figure 11:
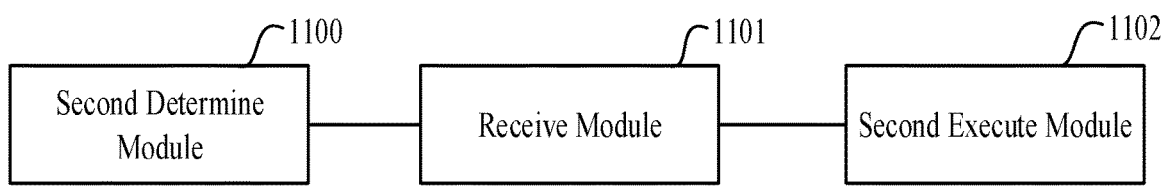
FIG. 11 is a schematic diagram of a structure of another receiving device according to the embodiment of the invention.

As illustrated by FIG. 11, the embodiment of the invention provides a receiving device for synchronization. The receiving device includes a second determine module 1100, a receive module 1101 and a second execute module 1102. The second determine module 1100 is configured to determine sampling positions according to a preset sampling method. The receive module 1101 is configured to receive a UDC compressed data packet. The second execute module 1102 is configured to sample data from a decompression buffer according to the determined sampling positions to generate a checksum, compare a checksum in the UDC compressed data packet and the generated checksum, and determine if the compression and decompression buffers are in sync according to a result of the comparison.

Optionally, the second determine module 1100 is further configured to: determine the sampling positions according to preset fixed position information or preset pattern position information.

Optionally, the fixed position information includes that first M bytes in the decompression buffer and/or last N bytes in the decompression buffer are taken as the sampling positions.

Optionally, the pattern position information includes part or all of: the number of bytes in a sampling period, the number of sampled bytes in a sampling period, sampling positions in a sampling period, the number of bytes in a sampling interval, the number of sampling intervals, the number of bytes sampled between two adjacent sampling intervals, and a sampling direction.

Optionally, the second determine module 1100 is further configured to: determine first X bytes and last X bytes in the compression buffer as two of the sampling positions, where X is the number of bytes sampled between two adjacent sampling intervals; and determine, among data in the compression buffer except the first X bytes and the last X bytes, the sampling positions according to the number of sampling intervals and the number of bytes sampled between two adjacent intervals.

The embodiment of the invention further provides a storage medium readable to a transmitting device for synchronization. The storage medium includes program codes. When the program codes are run by a computing device, the computing device performs the method performed by the transmitting device.

The embodiment of the invention further provides a storage medium readable to a receiving device for synchronization. The storage medium includes program codes. When the program codes are run by a computing device, the computing device performs the method performed by the receiving device.

Based on the same inventive conception, the embodiment of the invention further provides a synchronization method performed by a transmitting device. Since the device corresponding to the method is the transmitting device in the system for synchronizing buffers according to the embodiment of the invention, and the problem solving principles of the method is similar to those of the device, the implementation of the system may be a reference point for the implementation of the method which is not described further herein.

Figure 12:
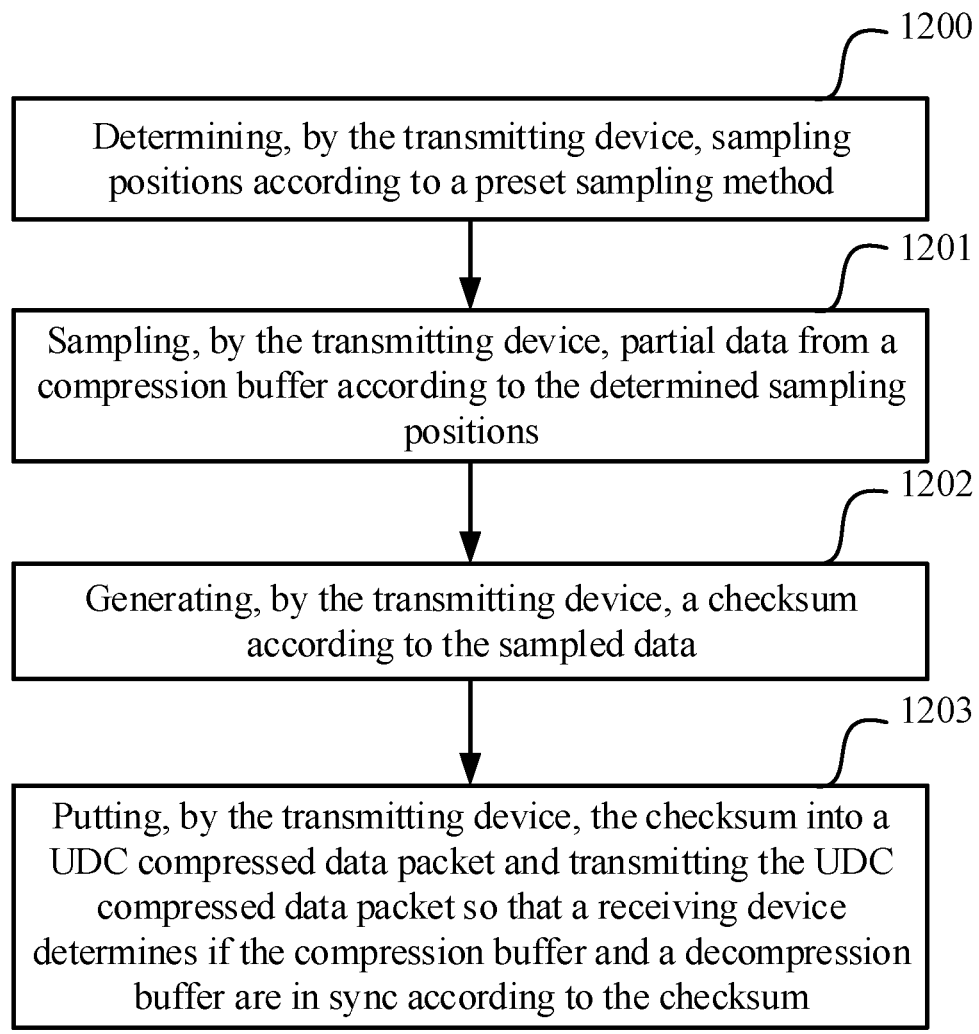
FIG. 12 is a flow chart of a method performed by a transmitting device according to the embodiment of the invention.

FIG. 12 illustrates the synchronization method by the transmitting device according to the embodiment of the invention. The method includes operations 1200-1203.

Operation 1200: determining, by the transmitting device, sampling positions according to a preset sampling method.

Operation 1201: sampling, by the transmitting device, data from a compression buffer according to the determined sampling positions.

Operation 1202: generating, by the transmitting device, a checksum according to the sampled data.

Operation 1203: putting, by the transmitting device, the checksum into a UDC compressed data packet and transmitting the UDC compressed data packet so that a receiving device determines if the compression buffer and a decompression buffer are in sync according to the checksum.

Optionally, determining, by the transmitting device, the sampling positions according to the preset sampling method includes: determining, by the transmitting device, the sampling positions according to preset fixed position information or preset pattern position information.

Optionally, the fixed position information includes that first M bytes in the compression buffer and/or last N bytes in the compression buffer are taken as the sampling positions.

Optionally, the pattern position information includes one or more of: the number of bytes included in a sampling period, the number of sampled bytes in a sampling period, sampling positions in a sampling period, the number of bytes in a sampling interval, the number of sampling intervals, the number of bytes sampled between two adjacent sampling intervals, and a sampling direction.

Optionally, the pattern position information includes the number of sampling intervals and the number of bytes sampled between two adjacent sampling intervals. Determining, by the transmitting device, the sampling positions according to the pattern position information, includes: determining, by the transmitting device, first X bytes and last X bytes in the compression buffer as two of the sampling positions, where X is the number of bytes sampled between two adjacent sampling intervals; and determining, by the transmitting device, among data in the compression buffer except the first X bytes and the last X bytes, the sampling positions according to the number of sampling intervals and the number of bytes sampled between two adjacent intervals.

Figure 13:
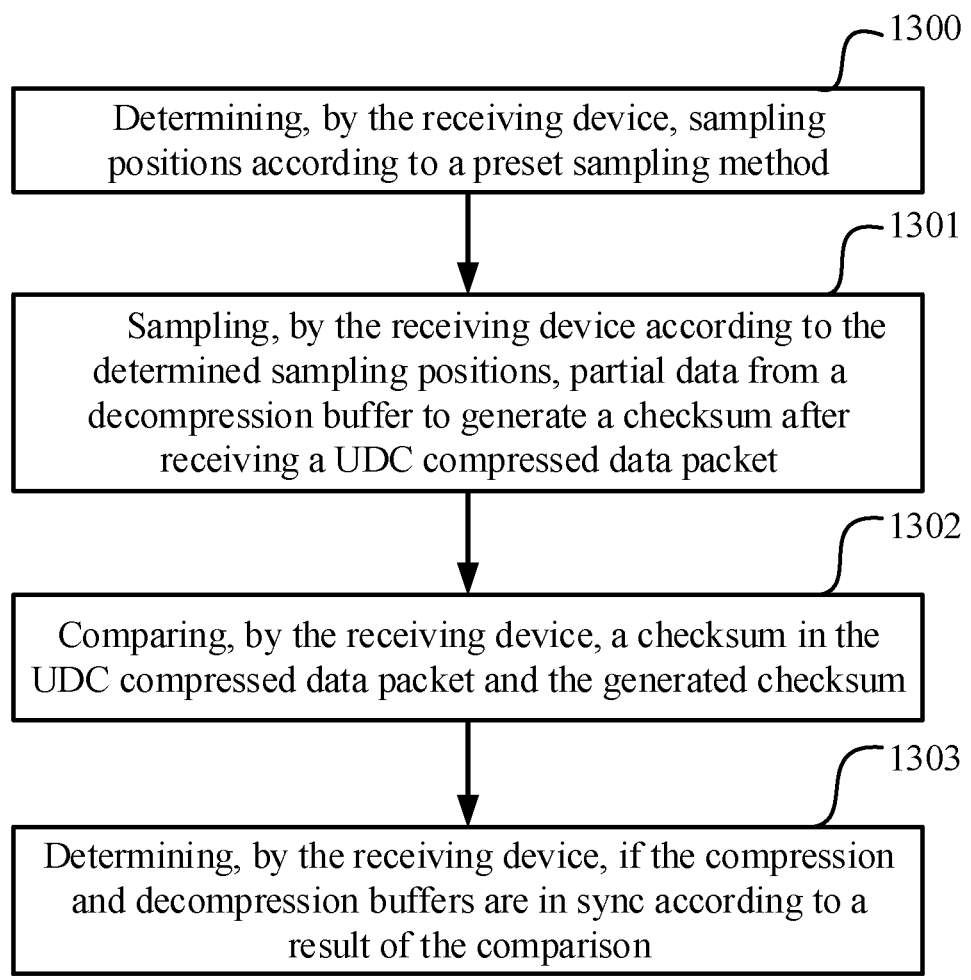
FIG. 13 is a flow chart of a method performed by a receiving device according to the embodiment of the invention.

FIG. 13 illustrates a synchronization method performed by a receiving device according to the embodiment of the invention. The method includes operations 1300-1303.

Operation 1300: determining, by the receiving device, sampling positions according to a preset sampling method.

Operation 1301: sampling, by the receiving device according to the determined sampling positions, partial data from a decompression buffer to generate a checksum after receiving a UDC compressed data packet.

Operation 1302: comparing, by the receiving device, a checksum in the UDC compressed data packet and the generated checksum.

Operation 1303: determining, by the receiving device, if the compression and decompression buffers are in sync according to a result of the comparison.

Optionally, determining, by the receiving device, the sampling positions according to the preset sampling method includes: determining, by the receiving device, the sampling positions according to preset fixed position information or preset pattern position information.

Optionally, the fixed position information includes that first M bytes in the decompression buffer and/or last N bytes in the decompression buffer are taken as the sampling positions.

Optionally, the pattern position information includes part or all of: the number of bytes included in a sampling period, the number of sampled bytes in a sampling period, sampling positions in a sampling period, the number of bytes in a sampling interval, the number of sampling intervals, the number of bytes sampled between two adjacent sampling intervals, and a sampling direction.

Optionally, the pattern position information includes the number of sampling intervals and the number of bytes sampled between two adjacent sampling intervals. Determining, by the receiving device, the sampling positions according to the pattern position information, includes: determining, by the receiving device, first X bytes and last X bytes in the compression buffer as two of the sampling positions, where X is the number of bytes sampled between two adjacent sampling intervals; and determining, by the receiving device, among data in the compression buffer except the first X bytes and the last X bytes, the sampling positions according to the number of sampling intervals and the number of bytes sampled between two adjacent intervals.

Figure 14:
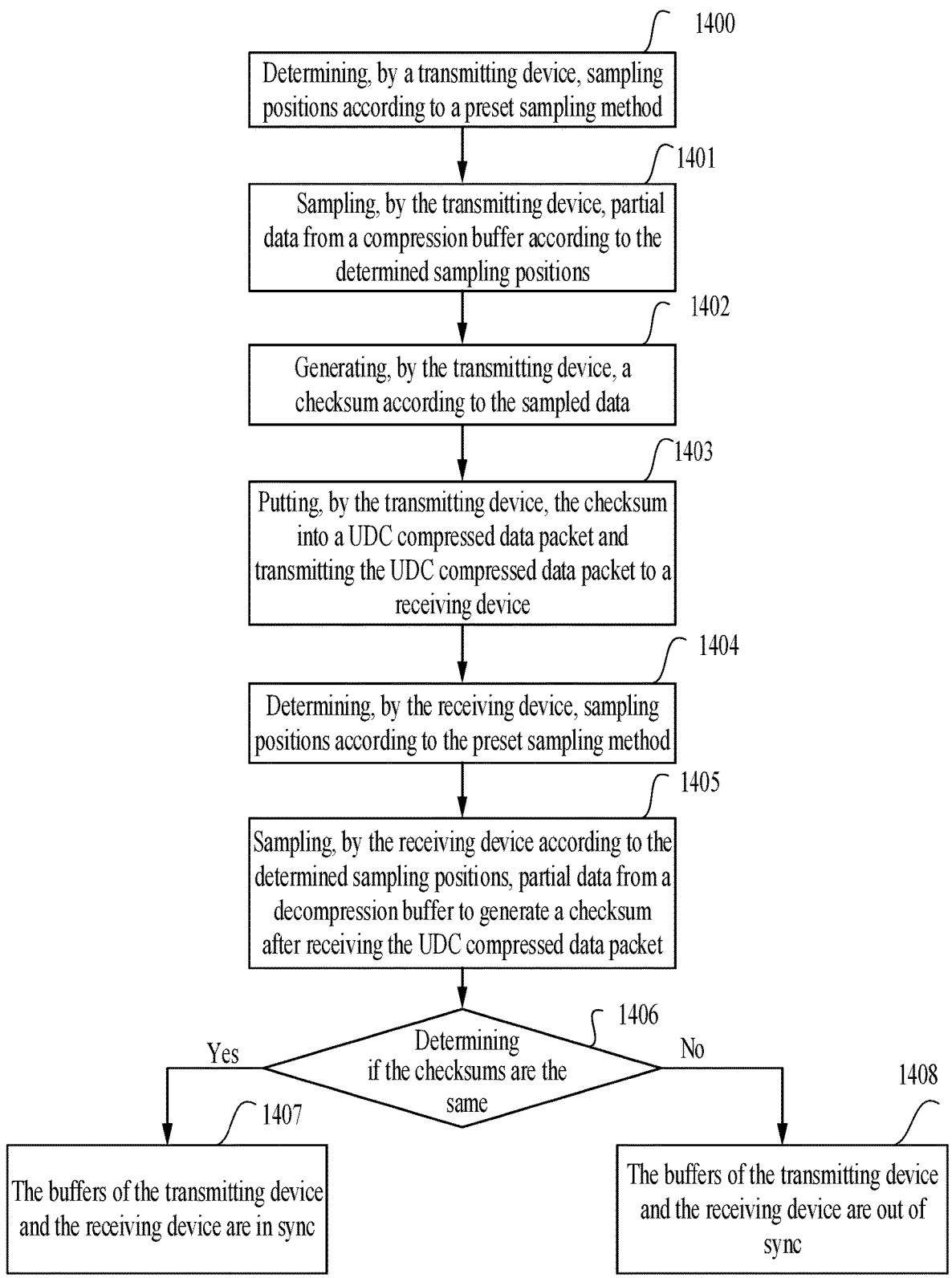
FIG. 14 is a flow chart of a complete method according to the embodiment of the invention.

FIG. 14 illustrates a complete synchronization method according to the embodiment of the invention. The method includes operations 1400-1408.

Operation 1400: determining, by a transmitting device, sampling positions according to a preset sampling method.

Operation 1401: sampling, by the transmitting device, data from a compression buffer according to the determined sampling positions.

Operation 1402: generating, by the transmitting device, a checksum according to the sampled data.

Operation 1403: putting, by the transmitting device, the checksum into a UDC compressed data packet and transmitting the UDC compressed data packet to a receiving device.

Operation 1404: determining, by the receiving device, sampling positions according to the preset sampling method.

Operation 1405: sampling, by the receiving device according to the determined sampling positions, data from a decompression buffer to generate a checksum after receiving the UDC compressed data packet.

Operation 1406: determining, by the receiving device, if the checksum in the UDC compressed data packet and the checksum generated by itself are the same, and performing operation 1407 if the checksums are the same, otherwise performing operation 1408.

Operation 1407: determining, by the receiving device that the buffer of the transmitting device and the buffer of the receiving device are in sync.

Operation 1408: determining, by the receiving device that the buffer of the transmitting device and the buffer of the receiving device are out of sync.

The methods, the devices (system) and the computer program product according to the embodiment of the invention have been described with reference to flow charts and/or block diagrams. It shall be appreciated that blocks of the flow charts and/or block diagrams, and/or, combinations of blocks of the flow charts and/or block diagrams may be implemented by computer program instructions. These computer program instructions can be loaded onto a general-purpose computer, a specific-purpose computer, an embedded processor or a processor of another programmable data processing apparatus to produce a machine so that the instructions executed by the processor of the computer or the other programmable data processing apparatus create means for performing the functions specified in the flows of the flow charts and/or the blocks of the block diagrams.

Accordingly, the embodiment of the invention may also be implemented by hardware and/or software (including firmware, resident software, microcode, etc.). Moreover, the embodiment of the invention may be implemented in the form of a computer program product on a computer-usable or computer-readable storage medium having computer-usable or computer-readable program codes implemented in the medium for use by an instruction execution system or in conjunction with the instruction execution system. Herein a computer-usable or computer-readable medium may be any medium that can contain, store, communicate, transmit, or transfer a program for use by or in connection with an instruction execution system, apparatus, or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A synchronization method, comprising:
   determining, by a transmitting device, sampling positions according to a preset sampling method;
   sampling, by the transmitting device, partial data from a compression buffer according to the determined sampling positions;
   generating, by the transmitting device, a checksum according to the sampled data; and
   putting, by the transmitting device, the checksum into an uplink data compression, UDC, compressed data packet and transmitting the UDC compressed data packet so that a receiving device determines if the compression buffer and a decompression buffer are in sync according to the checksum;
   wherein determining, by the transmitting device, the sampling positions according to the preset sampling method comprises:
   determining, by the transmitting device, the sampling positions according to preset pattern position information.

2. The method according to claim 1, wherein the pattern position information comprises part or all of:
   a quantity of bytes in a sampling period;
   a quantity of sampled bytes in the sampling period;
   sampling positions in the sampling period;
   a quantity of bytes in a sampling interval;
   a quantity of sampling intervals;
   a quantity of bytes sampled between two adjacent sampling intervals; and
   a sampling direction.

3. The method according to claim 2, wherein the pattern position information comprises the quantity of sampling intervals and the quantity of bytes sampled between two adjacent sampling intervals; and
   determining, by the transmitting device, the sampling positions according to the pattern position information, comprises:
   determining, by the transmitting device, first X bytes and last X bytes in the compression buffer as the sampling positions, wherein X is the quantity of bytes sampled between two adjacent sampling intervals; and
   determining, by the transmitting device, among data in the compression buffer except the first X bytes and the last X bytes, the sampling positions according to the quantity of sampling intervals and the quantity of bytes sampled between two adjacent intervals.

4. A synchronization method, comprising:
   determining, by a receiving device, sampling positions according to a preset sampling method;
   sampling, by the receiving device according to the determined sampling positions, partial data from a decompression buffer to generate a checksum after receiving an uplink data compression, UDC, compressed data packet;
   comparing, by the receiving device, a checksum in the UDC compressed data packet and the generated checksum; and
   determining, by the receiving device, if a compression buffer and the decompression buffer are in sync according to a result of the comparison;
   wherein determining, by the receiving device, the sampling positions according to the preset sampling method comprises:
   determining, by the receiving device, the sampling positions according to preset pattern position information.

5. The method according to claim 4, wherein the pattern position information comprises part or all of:
   a quantity of bytes in a sampling period;
   a quantity of sampled bytes in the sampling period;
   sampling positions in the sampling period;
   a quantity of bytes in a sampling interval;
   a quantity of sampling intervals;
   a quantity of bytes sampled between two adjacent sampling intervals; and
   a sampling direction.

6. The method according to claim 5, wherein the pattern position information comprises the quantity of sampling intervals and the quantity of bytes sampled between two adjacent sampling intervals; and determining, by the receiving device, the sampling positions according to the pattern position information, comprises:
  determining, by the receiving device, first X bytes and last X bytes in the decompression buffer as the sampling positions, wherein X is the quantity of bytes sampled between two adjacent sampling intervals; and
  determining, by the receiving device, among data in the decompression buffer except the first X bytes and the last X bytes, the sampling positions according to the quantity of sampling intervals and the quantity of bytes sampled between two adjacent intervals.

7. A receiving device for synchronization, comprising a processor, a memory and a transceiver;
  wherein the processor is responsible for managing bus architecture and general processing; the memory stores data used by the processor when performing operations; the transceiver is configured to receive and transmit data under control of the processor; and the processor is configured to read a program in the memory to perform the method according to claim 4.

8. The receiving device according to claim 7, wherein the pattern position information comprises part or all of:
  a quantity of bytes in a sampling period;
  a quantity of sampled bytes in the sampling period;
  sampling positions in the sampling period;
  a quantity of bytes in a sampling interval;
  a quantity of sampling intervals;
  a quantity of bytes sampled between two adjacent sampling intervals; and
  a sampling direction.

9. The receiving device according to claim 8, wherein the pattern position information comprises the quantity of sampling intervals and the quantity of bytes sampled between two adjacent sampling intervals; and the processor is further configured to read the program in the memory to:
  when determining the sampling positions according to the pattern position information, determine first X bytes and last X bytes in the decompression buffer as the sampling positions, wherein X is the quantity of bytes sampled between two adjacent sampling intervals; and
  determine, among data in the compression buffer except the first X bytes and the last X bytes, the sampling positions according to the quantity of sampling intervals and the quantity of bytes sampled between two adjacent intervals.

10. A transmitting device for synchronization, comprising a processor, a memory and a transceiver;
  wherein the processor is responsible for managing bus architecture and general processing; the memory stores data used by the processor when performing operations; the transceiver is configured to receive and transmit data under control of the processor; and the processor is configured to read a program in the memory to:
  determine sampling positions according to a preset sampling method; sample partial data from a compression buffer according to the determined sampling positions; generate a checksum according to the sampled data; and put the checksum into an uplink data compression, UDC, compressed data packet and transmit the UDC compressed data packet via the transceiver so that a receiving device determines if the compression buffer and a decompression buffer are in sync according to the checksum;
  wherein the processor is further configured to read the program to:
  determine the sampling positions according to preset pattern position information.

11. The transmitting device according to claim 10, wherein the pattern position information comprises part or all of:
  a quantity of bytes in a sampling period;
  a quantity of sampled bytes in the sampling period;
  sampling positions in the sampling period;
  a quantity of bytes in a sampling interval;
  a quantity of sampling intervals;
  a quantity of bytes sampled between two adjacent sampling intervals; and
  a sampling direction.

12. The transmitting device according to claim 11, wherein the pattern position information comprises the quantity of sampling intervals and the quantity of bytes sampled between two adjacent sampling intervals; and the processor is further configured to read the program to:
  when determining the sampling positions according to the pattern position information, determine first X bytes and last X bytes in the compression buffer as the sampling positions, wherein X is the quantity of bytes sampled between two adjacent sampling intervals; and
  determine, among data in the compression buffer except the first X bytes and the last X bytes, the sampling positions according to the quantity of sampling intervals and the quantity of bytes sampled between two adjacent intervals.

* * * * *